US00RE45673E

(19) United States
(12) Reissued Patent
Russell

(10) Patent Number: US RE45,673 E
(45) Date of Reissued Patent: Sep. 22, 2015

(54) LINE OF SIGHT HOSE COVER

(71) Applicant: YKK CORPORATION OF AMERICA, Marietta, GA (US)

(72) Inventor: Timothy M. Russell, Anniston, AL (US)

(73) Assignee: YKK Corporation of America, Marietta, GA (US)

(21) Appl. No.: 14/219,854

(22) Filed: Mar. 19, 2014

Related U.S. Patent Documents

Reissue of:
(64) Patent No.: 8,137,779
Issued: Mar. 20, 2012
Appl. No.: 12/040,596
Filed: Feb. 29, 2008

(51) Int. Cl.

| | |
|---|---|
| ***D03D 1/00*** | (2006.01) |
| ***D03D 15/00*** | (2006.01) |
| ***F16L 57/00*** | (2006.01) |
| ***D03D 3/02*** | (2006.01) |
| ***F16L 11/02*** | (2006.01) |
| ***F16L 57/02*** | (2006.01) |

(Continued)

(52) U.S. Cl.
CPC .. *D03D 1/00* (2013.01); *D03D 3/02* (2013.01); *D03D 11/02* (2013.01); *D03D 15/0094* (2013.01); *F16L 11/02* (2013.01); *F16L 57/00* (2013.01); *F16L 57/02* (2013.01); *B29K 2077/00* (2013.01); *B29K 2105/0845* (2013.01); *B29L 2023/005* (2013.01); *D10B 2331/021* (2013.01); *Y10T 428/1362* (2015.01)

(58) Field of Classification Search
CPC ..... D03D 1/00; D03D 3/02; D03D 15/0094; D03D 11/02; F16L 11/02; F16L 57/00; F16L 57/02; B29K 2077/00; B29K 2105/0845; B29L 2023/005; Y10T 428/1362; D10B 2331/021
USPC ..... 428/34.1, 35.7, 36.1, 36.9, 36.91; 442/203–206; 139/387 R
See application file for complete search history.

(56) References Cited

U.S. PATENT DOCUMENTS

| | | | |
|---|---|---|---|
| 3,623,513 | A | 11/1971 | Dinkelkamp |
| 3,799,440 | A | 3/1974 | Goss et al. |

(Continued)

FOREIGN PATENT DOCUMENTS

| | | | |
|---|---|---|---|
| AU | 2009220111 | B2 | 7/2012 |
| CN | 102782387 | A | 3/2011 |

(Continued)

OTHER PUBLICATIONS

International Patent Application No. PCT/US2009/031145, International Search Report and Written Opinion mailed Jul. 31, 2009, 6 pages.

(Continued)

*Primary Examiner* — Norca L Torres Velazquez
(74) *Attorney, Agent, or Firm* — Kilpatrick Townsend & Stockton LLP

(57) ABSTRACT

A hose cover for a high pressure hose is disclosed. The hose cover includes an outer sheath and an inner sheath disposed within the outer sheath. The inner and outer sheaths have a woven construction, each have a plurality of warp threads, and a weft thread that is interwoven between the warp threads. The weft thread is woven between the warp threads of the inner and outer sheaths in a pattern such that weft thread is shared between the inner and outer sheath and the inner and outer sheaths are interwoven together.

23 Claims, 5 Drawing Sheets

(51) Int. Cl.

| | |
|---|---|
| ***D03D 11/02*** | (2006.01) |
| *B29K 77/00* | (2006.01) |
| *B29K 105/08* | (2006.01) |
| *B29L 23/00* | (2006.01) |

(56) References Cited

U.S. PATENT DOCUMENTS

| | | | | |
|---|---|---|---|---|
| 3,831,635 | A | | 8/1974 | Burton |
| 4,174,739 | A | | 11/1979 | Rasero et al. |
| 4,345,624 | A | | 8/1982 | Rider |
| 4,349,049 | A | | 9/1982 | Silvey |
| 4,445,332 | A | | 5/1984 | Thies et al. |
| 4,446,607 | A | | 5/1984 | Merritt et al. |
| 4,585,035 | A | | 4/1986 | Piccoli |
| 4,688,605 | A | | 8/1987 | Eisenzimmer et al. |
| 4,944,258 | A | | 7/1990 | Knutson et al. |
| 5,042,515 | A | | 8/1991 | Boczkiewicz |
| 5,244,016 | A | | 9/1993 | Kuroda et al. |
| 5,273,080 | A | * | 12/1993 | Morohashi et al. ..... 139/388 |
| 5,361,806 | A | | 11/1994 | Lalikos et al. |
| 5,762,108 | A | | 6/1998 | Hunter |
| 5,843,542 | A | | 12/1998 | Brushafer et al. |
| 5,895,076 | A | | 4/1999 | Elliott |
| 6,085,796 | A | | 7/2000 | Riga |
| 6,446,671 | B2 | | 9/2002 | Armenia et al. |
| 6,688,338 | B2 | | 2/2004 | Meli et al. |
| 6,777,051 | B1 | | 8/2004 | Mazzer |
| 6,817,082 | B2 | | 11/2004 | Grepaly et al. |
| 7,178,559 | B2 | | 2/2007 | Tielemans et al. |
| 8,137,779 | B2 | | 3/2012 | Russell |
| 8,163,362 | B2 | | 4/2012 | Russell |
| 2005/0051226 | A1 | | 3/2005 | D'Amico |
| 2009/0105753 | A1 | | 4/2009 | Greenhalgh et al. |
| 2009/0220716 | A1 | | 9/2009 | Russell |
| 2010/0203268 | A1 | | 8/2010 | Russell |

FOREIGN PATENT DOCUMENTS

| | | | | |
|---|---|---|---|---|
| CN | ZL200980102317.3 | | | 12/2012 |
| EP | 0214835 | | | 3/1987 |
| EP | 0214835 | A2 | | 3/1987 |
| EP | 0481772 | | | 4/1992 |
| EP | 0481772 | A1 | | 4/1992 |
| FR | 2583072 | | | 12/1986 |
| FR | 2583072 | A1 | | 12/1986 |
| HK | 1142651 | | | 7/2011 |
| JP | 63196889 | U | | 12/1988 |
| JP | 04074788 | U | | 6/1992 |
| JP | 3051400 | | * | 3/2000 |
| JP | 3051400 | B1 | | 3/2000 |
| JP | 2000130638 | A | * | 5/2000 |
| KR | 200242178 | | | 10/2001 |
| RU | 2472059 | C2 | | 1/2013 |
| WO | 2009111100 | A1 | | 9/2009 |
| WO | WO2009/111100 | A1 | | 9/2009 |

OTHER PUBLICATIONS

European Patent Application No. EP 09716844, Search Report and Written Opinion mailed Aug. 18, 2010, 6 pages.
U.S. Appl. No. 12/040,596, Non-Final Office Action mailed Apr. 13, 2011, 10 pages.
U.S. Appl. No. 12/767,149, Non-Final Office Action mailed May 17, 2011, 13 pages.
U.S. Appl. No. 12/040,596, Final Office Action mailed Aug. 31, 2011, 6 pages.
U.S. Appl. No. 12/767,149, Final Office Action mailed Sep. 1, 2011, 8 pages.
Chinese Patent Application No. 200920102317.3, First Office Action mailed Dec. 2, 2011, 18 pages.
www.textronik.com/electronics/batch_counter.htm, Believed to be published at least as early as Dec. 18, 2003.
International Patent Application No. PCT/US2011/027500, International Search Report and Written Opinion mailed Dec. 21, 2011, 11 pages.
U.S. Appl. No. 12/040,596, Notice of Allowance mailed Jan. 10, 2012, 8 pages.
U.S. Appl. No. 12/767,149, Notice of Allowance mailed Jan. 25, 2012, 8 pages.
Australian Patent Application No. 2009220111, Examination Report No. 1 mailed Apr. 12, 2012, 2 pages.
Korean Patent Application No. 7018986/2010, Office Action mailed Jul. 20, 2012, 9 pages.
Chinese Patent Application No. 201180011079.2, First Office Action mailed Dec. 3, 2013, 12 pages.
Chinese Application No. 201180011079.2, Second Office Action mailed on Jul. 7, 2014, 6 pages.
International Search Report and Written Opinion for PCT/US2009/031145 dated Jul. 31, 2009.
Non-Final Office Action mailed from the U.S. Patent and Trademark Office on May 17, 2011 in U.S. Appl. No. 12/767,149; 16 pages.
Response to Non-Final Office Action filed in the U.S. Patent and Trademark Office on Jun. 22, 2011 in U.S. Appl. No. 12/767,149; 28 pages.
www.textronik.com/electronics/batch_counter.htm.
European Search Report and Written Opinion in European Patent Application No. EP09716844, Aug. 18, 2010.
PCT/US2011/027500, "International Search Report and Written Opinion," 11 pages, Dec. 21, 2011.

* cited by examiner

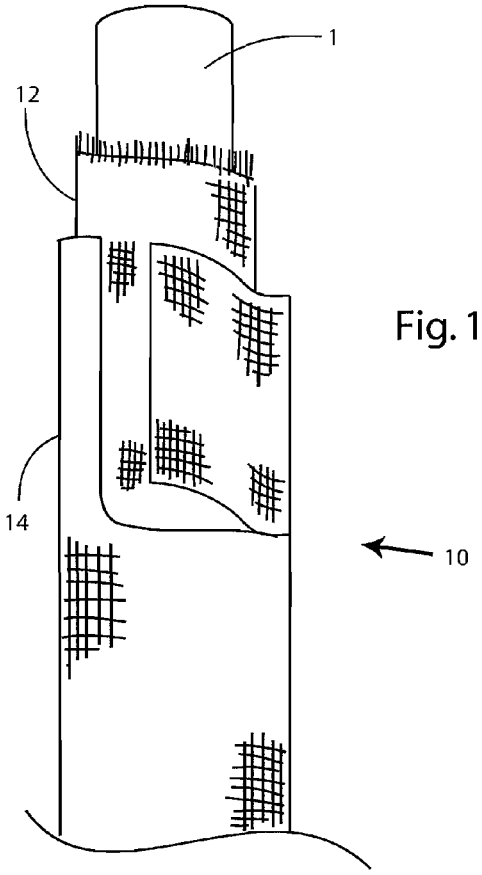
Fig. 1
Fig. 2
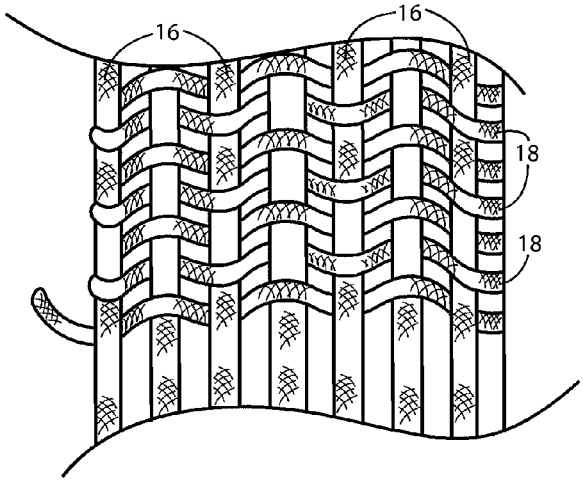

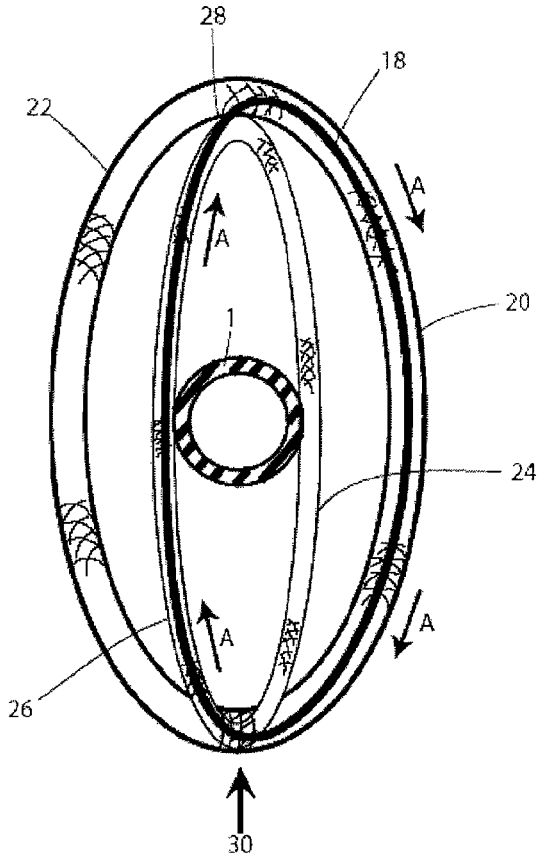
Fig. 3E
Fig. 4A
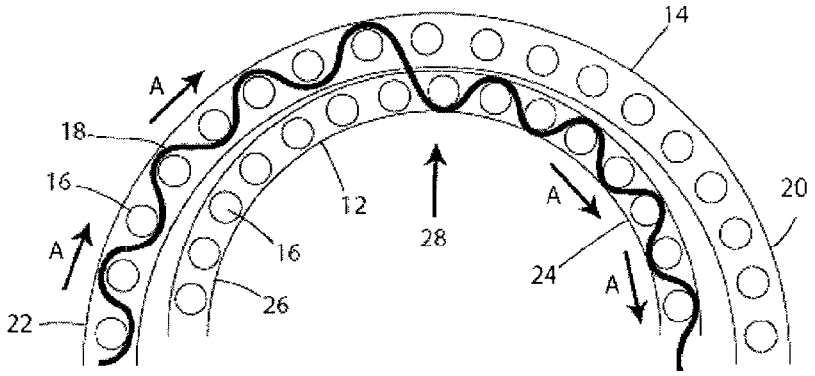

LINE OF SIGHT HOSE COVER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATION*

*This application is a reissue application of U.S. Pat. No. 8,137,779, the contents of which are hereby incorporated by reference.*

FIELD OF THE INVENTION

The present invention generally relates to hose covers, and more specifically to a cover for a high-pressure hose.

BACKGROUND OF THE INVENTION

High-pressure hoses present a danger to persons located in the surrounding areas. High-pressure hoses, for example hydraulic hoses located on machinery, present a danger to persons around the machinery that are exposed when the hose fails under high pressure.

Typically, a high pressure hose has two modes of failure. The hose can catastrophically burst or rupture or can develop a small hole in the wall which can be described as a pin hole failure. A large area of the hose typically fails when the hose has a catastrophic burst failure. This type of failure can be described as explosive and a large amount of fluid under high pressure is released from the hose. Persons in the area surrounding the hose may have fluid sprayed on them. The fluid may be hot or toxic, which potentially can cause injury to persons exposed to the fluid. Further, the high pressure hoses may have a metal jacket or outer covering. During the rupture of the hose, pieces of the hose can be ejected at high speed, turning into shrapnel having the potential to cause injury to persons in the area.

During a pin hole failure, a small hole develops in the wall of the high pressure hose. The rest of the hose remains intact and the fluid maintains a relatively high pressure. A high pressure jet of fluid is formed when fluid escapes from the hose through the pin hole at very high pressures. The high pressure jet has the potential to cause severe injury to surrounding personnel. The fluid escaping from a pin hole can result in the amputation of body parts. Also, the fluid jet can puncture the skin and can inject the fluid under the skin. The fluid injected under the skin, which may be oil, can cause severe injury, blood poisoning and/or require amputation of the affected body parts. Further, the fluid jet can puncture protective garments such gloves and result in the above injuries.

Thus, there is a need to protect personnel from catastrophic ruptures, pin hole failures, and other failures of high pressure hoses.

SUMMARY OF THE INVENTION

A hose cover for a high pressure hose is disclosed. The hose cover includes an outer sheath and an inner sheath disposed within the outer sheath. The inner and outer sheaths each have a woven construction and include a plurality of warp threads that extend in a longitudinal direction. A weft thread extends in a circumferential direction is woven between the warp threads. The weft thread is woven through the warp threads of the outer and inner sheaths such that the inner and outer sheaths have an interwoven construction.

BRIEF DESCRIPTION OF THE DRAWINGS

The foregoing and other features of the present invention will be more readily apparent from the following detailed description and drawings of illustrative embodiments of the invention in which:

FIG. 1 is a partial breakaway view showing a hose cover surrounding a hose according to an embodiment of the present invention;

FIG. 2 is a partial view illustrating the weave threads of the hose cover;

FIGS. 3A-3E are illustrating the weft pattern of the hose cover; and

FIGS. 4A-4B are close up views of the crossover points of FIGS. 3C and 3E respectively.

DETAILED DESCRIPTION OF THE INVENTION

Figure 3A:
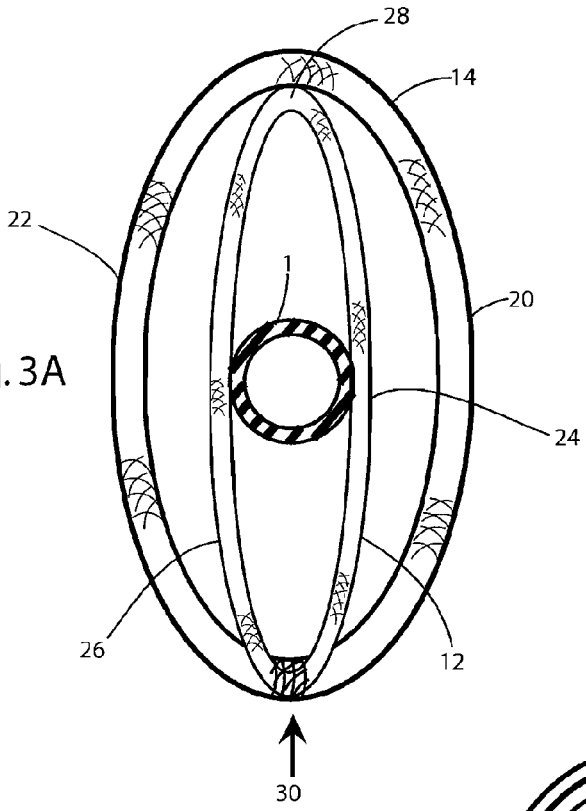

FIG. 1 is an illustration of a high pressure hose cover 10 according to an embodiment of the invention. The hose cover 10 consists of an inner sheath 12 and an outer sheath 14. The inner sheath 12 is disposed within the outer sheath 14, and when the hose cover 10 is in use, the high pressure hose 1 is disposed within the inner sheath 12. Thus, both the inner 12 and outer 14 sheaths surround the hose.

The inner 12 and outer 14 sheaths have a woven construction formed through the weaving of fibers. The fibers can be a number of different materials, such as synthetic materials including nylon, polyester and Kevlar™. Other materials may be selected depending on the type of fluid circulating in the hose or the operating environment in which the hose cover will be used. The material can be selected to help prevent the material of the hose cover 10 from being degraded by the fluid or the environment in which the hose cover will be used. Further, the warp threads 16 of the inner sheath 12 and the warp threads 16 of the outer sheath 14, as well as weft thread 18, can have different diameters. The threads can also be made from different materials.

As shown in FIG. 2, the sheaths 12, 14 are constructed of longitudinal warp threads 16 and circumferential weft threads 18 that are woven between the warp threads 16. The weft threads 18 are woven in a pattern such that the inner sheath 12 is interwoven with the outer sheath 14. FIGS. 3A-3E show the weft pattern for the inner and outer sheaths.

Figure 3B:
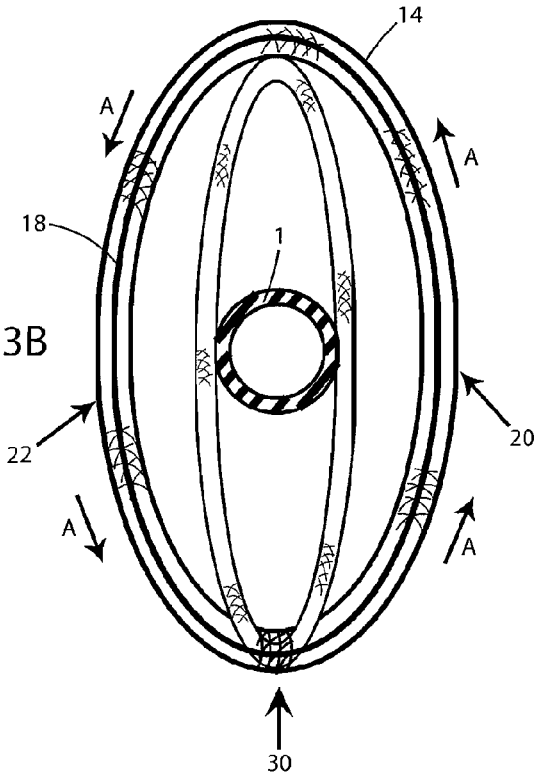
Figure 3C:
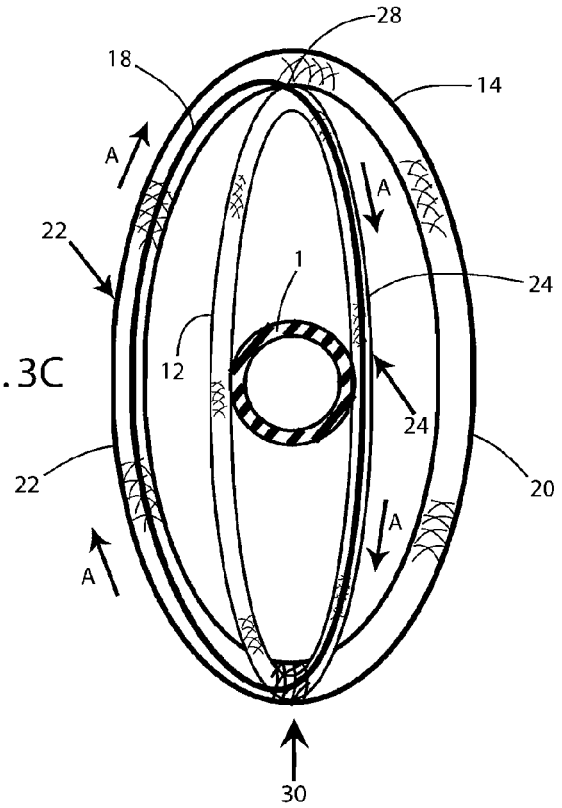

FIG. 3A illustrates the position of the wall of the inner and outer sheaths that are formed of the longitudinal warp threads 16 and the weft thread 18 that is woven in. The arrows A in FIGS. 3B-3E indicate the direction of the weft thread pattern as the weft thread 18 is woven in from the knit edge 30, around the inner or outer sheaths, and back to the knit edge 30 as the hose cover is formed. As can be seen in FIG. 3B, the weft thread extends from a first side 20 of the outer sheath 14 to second side 22 of the outer sheath 14. Then, as illustrated in FIG. 3C, the weft thread 18 extends from the second side 22 of the outer sheath 14 to a first side 24 of the inner sheath 12. At the crossover point 28, the weft thread 18 crosses from the outer sheath 14 in to the inner sheath 12. FIG. 4A is an illustrative magnified view that generally shows the weft thread 18 transitioning from the second side 22 of the outer sheath 14 to the first side 24 of the inner sheath 12 in one weaving pass of the weft thread (from weft insertion side 22 to the next weft insertion side 24). The weft thread 18 is woven between the warp threads 16 of the outer sheath. When the weft thread 18 reaches the crossover point 28 the weft thread 18 transitions to the inner sheath and is woven between the warp threads 16 of the inner sheath.

Figure 3D:
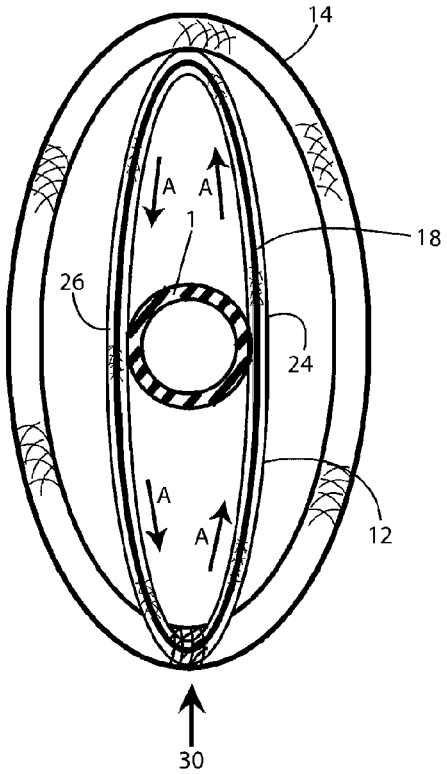
Figure 4B:
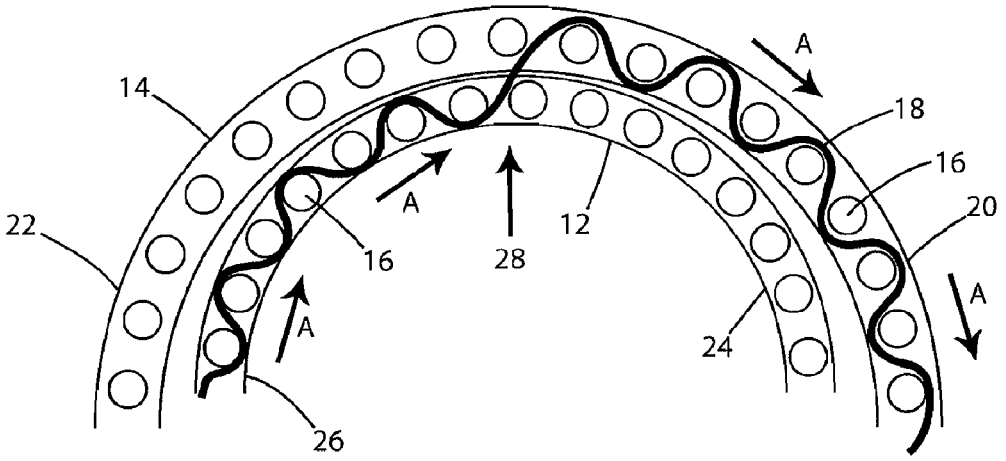

The weft thread 18 is then woven in from the first side 24 of the inner sheath 12 to a second side 26 of the inner sheath 12, as shown in FIG. 3D. The weft thread 18 then extends from the second side 26 of the inner sheath 12 and crosses over to the first side 20 of the outer sheath 14, as shown in FIG. 3E. FIG. 4B is an illustrative magnified view that generally shows the weft thread 18 transitioning from the second side 26 of the inner sheath 12 to the first side 20 of the outer sheath 14 in one weaving pass of the weft thread (from weft insertion side 26 to the next weft insertion side 20). The weft thread 18 is woven between the warp threads 16 of the inner sheath. When the weft thread 18 reaches the crossover point 28 the weft thread 18 transitions to the outer sheath and is woven between the warp threads 16 of the outer sheath.

The above described pattern of the weft is repeated to continue forming the inner and outer sheaths. Thus, FIGS. 3B-3E illustrate a four pass pattern. The weaving weft thread 18 creates layers where each successive pass of the weft thread is stacked onto the previous one. The repeated layering of the weft thread according to the four pass pattern creates the inner and outer sheaths of the hose cover.

The pattern the weft thread follows creates an inner sheath and an outer sheath that are interwoven with each other. The inner sheath is attached to the outer sheath at the knit edge 30 and at the crossover 28 where the weft thread crosses from the outer sheath 14 to the inner sheath 12 and from the inner sheath 12 to the outer sheath 14 due to the interweaving of the weft thread 18. The inner and outer sheaths do not have to be attached to each at any other points along their walls. The inner and outer sheaths are only attached at knit edge 30 and the crossover point 28 (or woven edge) where the weft crossover occurs. The knit edge 30 is also provided with a lock stitch thread to prevent the weave from unraveling. The knitting pattern at the knit edge is known as a weaving system #3. Other weaving systems may also be used such as a system 5.

The inner 12 and outer 14 sheaths can be two separate "layers" that are interconnected at the crossover point 28 where the weft thread 18 crosses between the inner and outer sheaths to interweave them, and connected together at the knit edge 30 by the knitting of the weft thread. The inner 12 and outer 14 sheaths can also consist of four separate "layers," first side 20 and second side 22 forming the outer sheath 14 and first side 24 and second side 26 forming the inner sheath 12. The four layers are connected along the woven edge at the crossover point 28 by the interweaving of the weft thread 18, and are connected along the opposite edge by the knitting of the weft thread at the knit edge 30.

The interweaving of the weft thread confers advantages to the hose cover's resistance to failures of the high pressure hose. The four pass pattern that is shown in FIGS. 3B-3E increases the burst resistance of the hose cover. The weft thread passes the knit and woven edges four times to complete the weaving pattern of the inner and outer sheaths. This increases the strength of both edges. Thus, the edges are more resistant to failure during an explosive rupture of a high pressure hose within the hose cover. The edges are less likely to fail during an explosive rupture of the of the high pressure hose because of the pattern of the weft thread. Further, the sharing of the weft thread between the inner and outer sheaths helps to transfer energy from the inner sheath to the outer sheath. When the high pressure hose 1 bursts the inner sheath 12 is first exposed to that energy because the inner sheath 12 directly surrounds the hose 1. The energy of the burst is also partially transferred to and absorbed by the outer sheath 14 because the weft thread 18 is shared between the inner and outer sheaths 12, 14. Since the inner and outer sheaths are not connected except at the knit edge 30 and the crossover point 28 (woven edge), the inner sheath 12 is allowed to expand as the rupture in the hose occurs, thereby absorbing some of the energy. As the inner sheath 12 expands and contacts the outer sheath 14 the remaining energy is transferred to the outer sheath, which further absorbs the energy of the ruptured hose. The outer sheath 14 also helps to protect the inner sheath 12 from abrasions.

The inner sheath 12 is formed with a high density weave. The fibers are woven at a high density to help absorb the energy of pin hole type failures of the high pressure hose. The diameter of the warp threads 16 of the inner sheath 12 may be smaller than the diameter of the warp threads 16 of the outer sheath 14 in order to achieve the higher density weave of the inner sheath. A high energy stream of fluid jets out when a small hole develops in the wall of the high pressure hose. The high pressure stream of fluid then contacts the inner sheath of the hose cover. The high density weave of the inner cover disperses the energy of the fluid stream. The high density weave prevents the separation of the fibers that would allow the fluid jet through the weave relatively unimpeded. When the stream impacts the high density weave of the inner sheath the stream is atomized or broken up and dispersed. The energy of the stream can also be absorbed by the inner sheath as the stream is dispersed. Thus, if fluid manages to pass through the inner sheath it escapes as a harmless low energy mist or seepage that is mostly contained by the outer sheath.

The inner 12 and outer 14 sheaths of the hose cover 10 are shown in FIGS. 3A-3E as having a diameter that is larger than the diameter of the hose 1. The diameter of the inner sheath 12 can be made larger than the diameter of the hose 1 so that the hose 1 fits loosely in the inner sheath 12. An inner sheath 12 with a diameter larger than the diameter of the hose 1 would allow the hose cover 10 to be easily placed over the hose 1. Alternatively, the diameter of the inner sheath 12 can be made just slightly larger than the diameter of the hose 1 so that the hose 1 fits snuggly in the inner sheath 12.

A hose cover having warp threads and a weft pattern as described above underwent testing to determine its effectiveness to contain a high pressure hose failure. According to one embodiment of the present invention, the warp material used for the outer sheath was 2780 D solution black AJT nylon. The warp material for the inner sheath was 1680 natural nylon T/6. The weft material was 420 d Solution black nylon. The outer sheath had a 101,470 total denier per inch of width in the warp direction, the inner sheath had a 61,320 total denier per inch of width in the warp direction, and the weft had a 87,360 total denier per inch of length. The combination used provides for a tighter, thinner weave for the inner sheath as compared to the outer sheath, giving the fabric of the inner sheath a very low permeability. The hose cover was placed around a hydraulic hose and underwent burst testing. The fluid pressure in the hose was consistently increased until the hose ruptured inside the hose cover. The hose cover remained intact and the energy of the escaping fluid was dissipated and the fluid harmlessly seeped out of the cover as desired. A conventional hose cover was also subjected to similar testing and failed. The cover was torn by escaping fluid at the place the hydraulic hose failed.

The hose cover according to the embodiment of the invention described above was also subjected to impulse testing to test the hose cover's resistance to pin hole type failures. A small hole having a diameter of approximately 0.038 inch was drilled into the wall of the hydraulic hose and a hose cover was then placed around the hydraulic hose. The fluid pressure inside the hose was cycled to a test pressure of 3,200 psi at a rate of 70 cycles per minute for 30 minutes with the fluid temperature at 212° F. The hose cover remained intact with fluid seeping through the outer sheath of hose cover at low energy. A conventional hose cover was subjected to similar testing and the cover was completely penetrated by a jet of fluid exiting from the hole in the hydraulic hose and the jet exited at high pressure.

The hose cover 10 provides protection against both high energy bursting of a high pressure hose as well as small holes in the hose that allow high pressure streams to escape. The energy of these types of failures is absorbed by the weave and interweave of the hose cover. The fluid that is released by the failure of the hose can be allowed to seep through body of the cover around the area of the failure. The pooling of fluid alerts personnel of the hose failure without causing injury to personnel from the high energy release of fluid.

While the invention has been particularly shown and described with reference to preferred embodiments thereof, it will be understood by those skilled in the art that various changes in form and details may be made therein without departing from the spirit and scope of the invention.

The invention claimed is:

1. A high pressure hose cover, comprising:

an outer sheath having a woven construction that includes a plurality of warp threads that extend in a longitudinal direction;

an inner sheath having a woven construction that includes a plurality of warp threads that extend in [a] *the* longitudinal direction, the inner sheath being disposed within the outer sheath;

a weft thread that extends in a circumferential direction, wherein the weft thread is:

(i) interwoven between only the plurality of warp threads of the outer sheath along a first section of the *hose* cover;

(ii) interwoven between only the plurality of warp threads of the inner sheath along a second section of the *hose* cover; and (iii) interwoven between the warp threads of the inner and outer sheaths in a pattern such that the weft thread is shared between the inner and outer sheaths along at least a first connection section and a second connection section [of the sheath], wherein each of the first and the second connection sections includes at least one warp thread, and wherein, in the first connection section, the weft thread transitions from the first section to the second section and, in the second connection section, the weft thread transitions from the second section to the first section.

2. The high pressure hose cover according claim 1, wherein the pattern in which the weft thread is woven is from a first side of the outer sheath to a second side of the outer sheath, from a second side of the outer sheath to a first side of the inner sheath, from a first side of the inner sheath to a second side of the inner sheath, and from a second side of the inner sheath to a first side of the outer sheath.

3. The high pressure hose cover of claim 1, wherein, within the first section, the weft thread interweaves all of the warp threads of the outer sheath and, within the second section, the weft thread interweaves all of the warp threads of the inner sheath, and, within the *first and second* connection [section] *sections*, the weft thread interweaves only one of the warp threads of the outer sheath with only one of the warp threads of the inner sheath.

4. The high pressure hose cover of claim 1, wherein each of the first and second connection sections includes at least one warp thread from the outer sheath and at least one warp thread from the inner sheath.

5. The high pressure hose cover of claim 1, wherein, in the first section, the weft thread interweaves each of the warp threads in the first section and wherein, in the second section, the weft thread interweaves each of the warp threads in the second section.

*6. A high pressure hose cover comprising:*

*an outer sheath comprising a first outer side and a second outer side, wherein each of the first outer side and the second outer side comprises a plurality of warp threads that extend in a longitudinal direction;*

*an inner sheath comprising a first inner side and a second inner side, wherein each of the first inner side and the second inner side comprises a plurality of warp threads that extend in the longitudinal direction, and wherein the first outer side covers the first inner side and the second outer side covers the second inner side;*

*a weft thread that extends in a circumferential direction;*

*wherein the weft thread is interwoven between only the warp threads of the first outer side or only the warp threads of the second outer side in at least one outer section;*

*wherein the weft thread is interwoven between only the warp threads of the first inner side or only the warp threads of the second inner side in at least one inner section;*

*a first crossover point comprising at least one warp thread and wherein the weft thread transitions from the outer sheath to the inner sheath; and*

*a second crossover point comprising at least one warp thread and wherein the weft thread transitions from the inner sheath to the outer sheath.*

*7. The high pressure hose cover of claim 6, wherein the first outer side comprises a plurality of outer sections along the longitudinal direction of the hose cover and the second outer side comprises a plurality of outer sections along the longitudinal direction of the hose cover.*

*8. The high pressure hose cover of claim 6, wherein the first inner side comprises a plurality of inner sections along the longitudinal direction of the hose cover and the second inner side comprises a plurality of inner sections along the longitudinal direction of the hose cover.*

*9. The high pressure hose cover of claim 6, wherein:*

*at the first crossover point, the weft thread transitions from the first outer side to the second inner side; and*

*at the second crossover point, the weft thread transitions from the first inner side to the second outer side.*

*10. The high pressure hose cover of claim 6,*

*wherein the at least one outer section comprises at least one first outer section and at least one second outer section, wherein the weft thread is interwoven between only the warp threads of the first outer side along the at least one first outer section and wherein the weft thread is interwoven between only the warp threads of the second outer side along the at least one second outer section; and*

*wherein the at least one inner section comprises at least one first inner section and at least one second inner section, wherein the weft thread is interwoven between only the warp threads of the first inner side along the at least one first inner section and wherein the weft thread is interwoven between only the warp threads of the second inner side along the at least one second inner section.*

*11. The high pressure hose cover of claim 6, wherein:*

*within each of the at least one outer sections, the weft thread interweaves all of the warp threads of either the first outer side or the second outer side and;*

*within each of the at least one inner sections, the weft thread interweaves all of the warp threads of either the first inner side or the second inner side.*

*12. The high pressure hose cover of claim 6, wherein, at the first and second crossover points, the weft thread interweaves only one of the warp threads of the outer sheath with only one of the warp threads of the inner sheath.*

*13. The high pressure hose cover of claim 6, wherein each of the first and second crossover points includes at least one warp thread from the outer sheath and at least one warp thread from the inner sheath.*

*14. The high pressure hose cover of claim 6, wherein the first and second crossover points are located along a crossover edge of the hose cover and wherein the hose cover further comprises a knit edge located along an opposite edge of the hose cover.*

*15. The high pressure hose cover of claim 14, wherein the outer sheath and the inner sheath are connected at the crossover edge and the knit edge.*

*16. A high pressure hose cover comprising:*

*an outer sheath comprising a plurality of warp threads that extend in a longitudinal direction to form a first outer side and a second outer side;*

*an inner sheath comprising a plurality of warp threads that extend in the longitudinal direction to form a first inner side and a second inner side, wherein the first outer side covers the first inner side and the second outer side covers the second inner side;*

*a crossover edge that extends along the hose cover in the longitudinal direction and a knit edge that extends along the hose cover in the longitudinal direction and that is opposite the crossover edge, wherein the first outer side, the second outer side, the first inner side, and the second inner side are connected to one another at each of the crossover edge and the knit edge; and*

*a weft thread that extends in a circumferential direction and that:*

*is interwoven between only the warp threads of the first outer side along a first outer section;*

*is interwoven between only the warp threads of the second outer side along a second outer section;*

*is interwoven between only the warp threads of the first inner side along a first inner section;*

*is interwoven between only the warp threads of the second inner side along a second inner section;*

*transitions from the outer sheath to the inner sheath at a first crossover point of the crossover edge; and*

*transitions from the inner sheath to the outer sheath at a second crossover point of the crossover edge.*

*17. The high pressure hose cover of claim 16, wherein the outer sheath and the inner sheath are unconnected to one another between the crossover edge and the knit edge.*

*18. The high pressure hose cover of claim 16, further comprising an opening to receive a hose that is positioned between the first inner side and the second inner side.*

*19. The high pressure hose cover of claim 16, wherein each of the first outer section, the second outer section, the first inner section, and the second inner section comprises at least one warp thread.*

*20. The high pressure hose cover of claim 16, wherein each of the first crossover point and the second crossover point comprises at least one warp thread.*

*21. The high pressure hose cover of claim 16, wherein, at the first and second crossover points, the weft thread interweaves only one of the warp threads of the outer sheath with only one of the warp threads of the inner sheath.*

*22. The high pressure hose cover of claim 16, wherein each of the first and second crossover points comprises at least one warp thread from the outer sheath and at least one warp thread from the inner sheath.*

*23. The high pressure hose cover of claim 16, wherein:*

*at the first crossover point, the weft thread transitions from the first outer side to the second inner side; and*

*at the second crossover point, the weft thread transitions from the first inner side to the second outer side.*

* * * * *